United States Patent
Bartlett

(10) Patent No.: US 6,611,752 B1
(45) Date of Patent: Aug. 26, 2003

(54) TRANSLATION TECHNOLOGY FOR NAVIGATION SYSTEM ARRANGEMENT

(75) Inventor: Charles S. Bartlett, Arlington, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/142,769

(22) Filed: May 13, 2002

(51) Int. Cl.[7] ............................................. G01C 21/26
(52) U.S. Cl. ..................... 701/200; 701/213; 73/178 R; 340/988
(58) Field of Search ................................. 701/200, 201, 701/213; 73/178 R; 340/988, 991, 993

(56) References Cited

U.S. PATENT DOCUMENTS

| | | | |
|---|---|---|---|
| 6,073,075 A | * | 6/2000 | Kondou et al. ............. 701/203 |
| 6,085,090 A | * | 7/2000 | Yee et al. .................... 455/440 |
| 6,133,853 A | * | 10/2000 | Obradovich et al. ........ 340/905 |
| 6,462,674 B2 | * | 10/2002 | Ohmura et al. ............. 340/901 |
| 6,507,850 B1 | * | 1/2003 | Livshutz et al. ............ 701/201 |
| 6,515,595 B1 | * | 2/2003 | Obradovich et al. ........ 340/905 |
| 6,525,768 B2 | * | 2/2003 | Obradovick ........... 348/231.99 |

* cited by examiner

Primary Examiner—William A. Cuchlinski, Jr.
Assistant Examiner—Olga Hernandez

(57) ABSTRACT

Disclosed is a navigation data translating method and arrangement. A translating device translates a destination data in an original format into a predetermined format, such as into American Standard Code for Information Interchange (ASCII). A communication device communicates the predetermined format to an offboard source that has navigation route data thereon. The communication device receives specific navigation route data from the offboard source in the predetermined format. The translating devices translates the received specific navigation route data into the original format type and sends the translated data onto an input/output device that disseminates the translated route data.

24 Claims, 4 Drawing Sheets

TRANSLATION TECHNOLOGY FOR NAVIGATION SYSTEM ARRANGEMENT

BACKGROUND OF THE INVENTION

1. Field of the Invention

The present invention relates generally to navigation technology, and more particularly, to navigation technology implementing external navigation data storage devices.

2. Related Art

In recent years, navigation systems for use with automobiles have become popular. Such navigation systems typically include a display screen, an input technology such as a keypad or remote control, and a storage technology such as a CD. Geographical map and routing data is typically stored on the CD as a map database.

The map database on the CD can have various levels of detail. At the very least, the map database includes geographical information at the major road level. Additional details that can be included in the map database are major roads, turn restrictions, one-way streets, highway ramp configurations, hotel, restaurant and other business information, traffic history, emergency facility locations, and the like. The data of such map databases with routing information are referred to as navigable map data or turn-by-turn data. The level of detail stored in these map databases depends on product and marketing factors, including cost and demand, as well as physical storage capability limitations.

The described navigation systems are stand-alone devices that rely completely on data stored on a local source device for geographical and other related information. Thus, the capacity of the storage device becomes a limiting factor as to how much information is available to a user. In addition, the user must update the mapping database frequently to stay current. Typically, the cost of mapping databases increases with the amount of detail provided thereon.

Another type of navigation system, that can be used with automobiles, does not use a geographic database installed locally with a navigation system interface unit. Instead, this type of navigation system uses a wireless communication link to access a remote geographic database. This type of navigation system does not require that updated geographic data be obtained from time-to-time, because the remote geographic database can be updated as frequently as needed. However, this type of navigation system is unable to receive timely geographic data from the remote geographic database as a result of the large amount of data that must be transmitted over the wireless communication link. In particular, the geographic data is known to have high overhead, where current wireless communication links are known to have limited data transmission capabilities. Therefore, navigation systems that use remote geographic databases have been for the most part commercially infeasible.

SUMMARY OF THE INVENTION

An embodiment of present invention is directed to a method and arrangement for translation of navigation data using a telematics unit. The telematics unit includes an input/output element, a translating element, and a transceiver element. The transceiver element of the telematics unit is interfaced with an offboard navigation database unit and at least one Global Positioning System (GPS) satellite, or a similar system capable of providing up-to-date coordinate data.

The translating element serves at least two functions. First, the translating element receives input destination data, in an original format, from the input/output element. The translating element then translates the input destination data from its original format type to a specific format type. For example, the translating element may translate binary data to American Standard Code for Information Interchange (ASCII), or a compressed format. Second, the translating element also receives data from the transceiver element. The data from the transceiver element includes specific navigation routing data from the offboard navigation database. The translating element is responsible for translating the specific navigation route data into data that is readable by the input/output element.

BRIEF DESCRIPTION OF THE DRAWINGS

The present invention will become more fully understood from the detailed description given hereinbelow and the accompanying drawings which are given by way of illustration only, wherein reference numerals designate corresponding parts in the various drawings and wherein.

DETAILED DESCRIPTION OF THE PREFERRED EMBODIMENT

Figure 1:
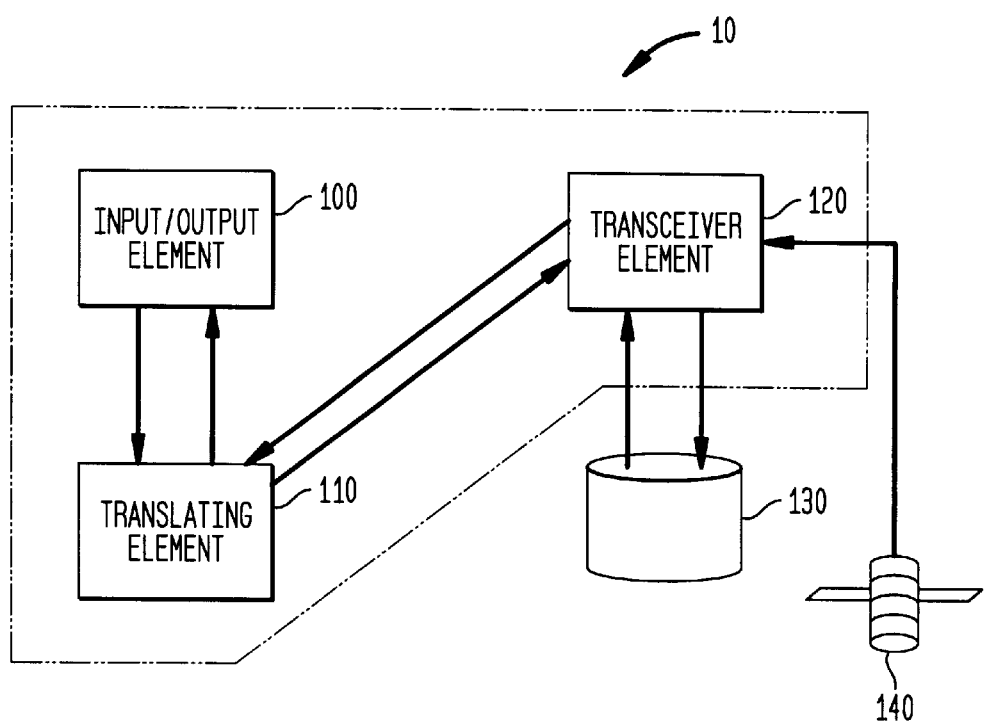
FIG. 1 illustrates a navigation data translation arrangement according to an embodiment of the present invention.

FIG. 1 illustrates a navigation data translation arrangement, including a telematics unit, according to an embodiment of the present invention. The telematics unit 10 includes an input/output element 100, a translating element 110, and a transceiver element 120. The telematics unit 110 is in communication with an offboard navigation database 130 and at least one GPS satellite 140, or a plurality of GPS satellites as needed.

The input/output element 100 is shown in generic form, as it may be of various different types of input/output elements. In particular, the input/output element 100 may be a touch screen device, a keyboard interface with a display device, a voice recognition arrangement, a personal digital assistant (PDA), or an electronic notepad. Those of ordinary skill in the relevant arts readily recognize that various other input/output elements may also be used.

In the case where the input/output element 100 is a voice recognition arrangement, the input/output element 100 is designed having a limited number of voice commands stored therein. These limited number of voice commands are either "taught" to the element 100 by the user of the telematics device 10, or generally pre-stored within the input/output element 100 at a time of manufacture. The limited vocabulary of the input/output element 100 may include words associated with known landmarks (e.g., restaurants, parks and/or recreation areas, well-known monuments, hotels, museums, etc.).

The input/output element 100 may also be capable of "learning" additional voice phrases. In particular, a user of the telematics unit 10 may use the input/output element 100 to download additional voice phrases from the offboard navigation database 130. For example, should the user of the telematics unit 10 generally require navigation data related to restaurants, the user may instruct the input/output element 100 to download or retrieve specific restaurant data from the offboard navigation database 130. Such downloadable data may be stored in a memory of the input/output element 100 on a temporary or permanent basis. If the input/output element 100 is designed to store such information on a temporary basis, the information may be eliminated from the input/output element 100 after a predetermined amount of time. Alternatively, the input/output element 100 may eliminate the temporary information after the memory storing this information reaches its maximum capacity. After that, as additional information is downloaded into the memory of the input/output element 100, the oldest stored information in the memory will be discarded.

In the case of the input/output element 100 being a voice recognition arrangement, the input/output element 100 is therefore capable of also producing audible sounds. Specifically, as the input/output element 100 receives specific navigation route data (described hereinafter), the input/output element 100 communicates this data as an audible signal. Conversion of the route data to audible speech is accomplished by well-known speech synthesis methods.

In the case where the input/output element 100 is a touch screen device or a PDA, the input/output element 100 functions to send commands to the translating element 110, and finally to the offboard navigation database 130, by way of either handwritten text or user selectable options. For example, the input/output element 100 may incorporate specific menus from which a user may select from various predetermined destinations. Specifically, the input/output element 100 may include various menus where one menu includes restaurants, another menu includes parks and/or recreation areas, and yet another menu includes hotels, etc. The user may then choose a specific menu type (e.g., Restaurants), and then, a particular menu entry (e.g. Outback Steakhouse™), which is then sent to the translating element 110 and further onto the offboard navigation database 130. Alternatively, in the case where the input/output element 100 is designed to receive electronic handwritten text, user input handwritten text is sent to the translating element 110, and further onto the offboard navigation database 130 for determination of necessary route data.

Although each specific input/output element type has not been discussed in detail, those of ordinary skill in the relevant arts will fully appreciate from the foregoing that other types of input/output elements may also be implemented with the present invention.

The translating element 110 will now be discussed in detail. As is illustrated in FIG. 1, the translating element 110 is in bidirectional communication with both the input/output element 100 and the transceiver element 120. The bidirectional communication may be over a single medium, or a plurality of mediums as desired.

Regardless of the specific type of the input/output element 100 implemented, the translating element 110 is responsible for translating data received from the input/output element 100 into American Standard Code for Information Interchange (ASCII) or another type of compressed or simplified form of the data. For example, in the case where the input/output element 100 is a voice recognition arrangement, the input/output element 100 receives voice data and associates it with a known voice phrase stored within a memory thereof. This phrase is then transmitted to the translating element 110 in a format generated by the input/output element 100. In particular, this format may be binary data, compressed binary data, machine language data, etc. The translating element is responsible for receiving this data, having high overhead, and translates the received data into a corresponding ASCII format. The translated ASCII data is then sent to the transceiver element 120 for further processing.

Similarly, although not discussed in detail for brevity reasoning, the translating element 110 may be designed to translate data received from the input/output element 100, regardless of the specific type of the input/output element 100 (e.g., a touch screen computer, PDA, etc.) employed by the telematics unit 10. In particular, in a case where the input/output element 100 is a PDA, the translating element 110 would be fully capable of translating electronically composed handwritten text in the form of binary data, or the like. The translating element 110 would simply convert the binary data into representative ASCII format for further communication to the transceiver element 120.

The translating element 110 is also capable of receiving navigation/route data from the transceiver element 120. The data from the transceiver element 120 originates from the offboard navigation database 130. Typically, the data sent by the offboard navigation database 130 will be in ASCII format. Therefore, the translating element 110 is responsible for translating the navigation/route data in ASCII format to a format acceptable to the input/output element 100. For example, in the case where the input/output element 100 is a voice recognition arrangement, the translating element 110 will translate the route data in ASCII format into binary data decipherable by a voice recognition synthesis engine incorporated by the input/output element 100. Alternatively, if the voice synthesis engine incorporated by the input/output element 100 is capable of deciphering ASCII data, the translating element 110 may simply operate as a pass-through element for data received from the transceiver element 120. Of course, depending upon the type of input/output element 100 implemented with the telematics unit 10, the translating element 110 will provide translated route data in accordance with the type of data that is capable of being processed by the input/output element 100.

Turning now to the transceiver element 120, as illustrated in FIG. 1, the transceiver element 120 is in bidirectional communication with the translating element 110 and the offboard navigation database 130. The bidirectional communication with the translating element 110 may be over a single medium, or a plurality of mediums. In addition, the transceiver element 120 is also connected to at least the one GPS satellite 140. The transceiver element 120 simply serves as a communication element for distributing data received from the offboard navigation database 130 and the translating element 110.

With regard to the data received by the transceiver element 120 from the satellite 140, this data is used in conjunction with both the destination data originated from the input/output element 100 and the route data supplied by the offboard navigation database 130. Specifically, when translated destination data (originated from the input/output element 100) is received from the translating element 110, the transceiver element 120 polls the at least one satellite 140 for GPS positional data related to a current location. That is, a current location relative to an entity using the telematics unit 10. The transceiver element 120 uses the GPS current position data supplied by the satellite 140 with the ASCII destination data provided by the translating element 110 to create a combined destination and current location package 40 (see FIG. 4) that is communicated to the offboard navigation database 130. This package 40 is used by the offboard navigation database 130 to determine a route data package 80 (FIG. 5). Both packages 40 and 80 will be discussed in more detail hereinafter.

Although the telematics unit 10 illustrated in FIG. 1 is shown as an integrated device, those of ordinary skill in the relevant arts fully appreciate that the specific elements of the telematics unit 10 may be embodied as separate and distinct units. This concept is fully appreciated by the embodiments of the present invention.

Figure 2:
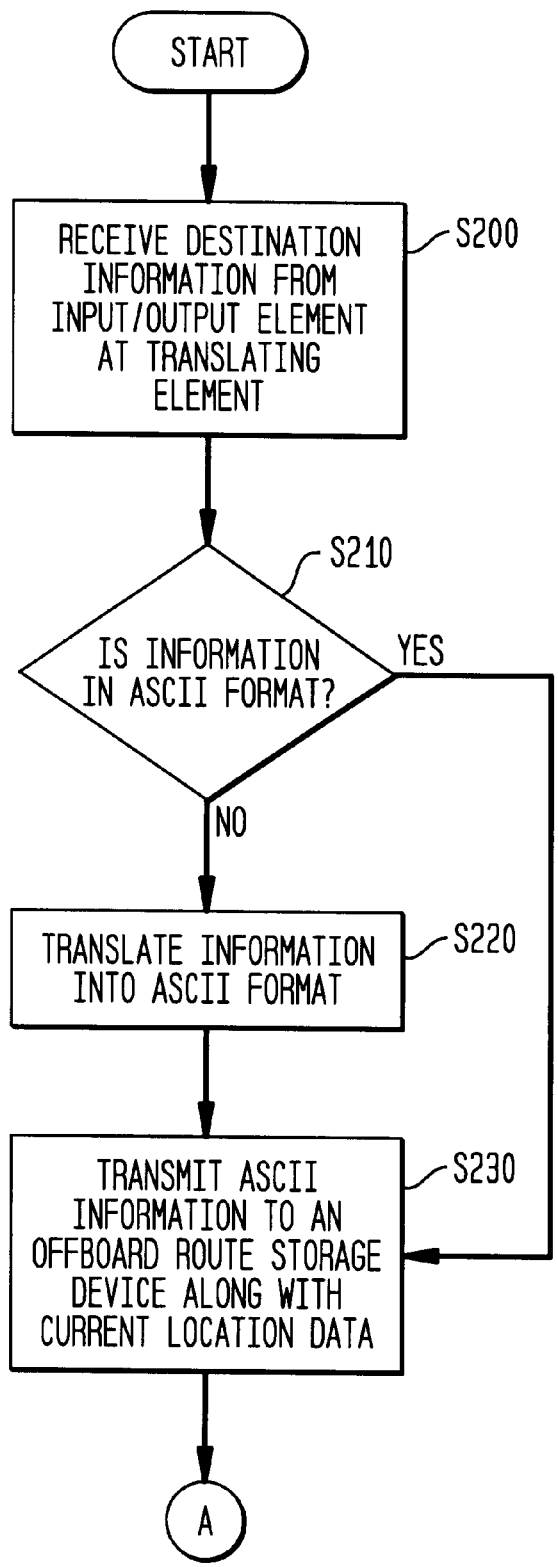
FIG. 2 illustrates a navigation data translation method according to an embodiment of the present invention.

FIG. 2 illustrates a method of navigation data translation according to an embodiment of the present invention. After having been input into the input/output element 100, the translating element 110 receives the destination data therefrom (S200). The translating element 110 determines if the received destination data is in ASCII format (S210). If the received data is not in ASCII format, then the translating element 110 translates the received destination data into ASCII format (S220). The translated destination data in ASCII format is then sent to the transceiver element 120. Alternatively, at step S210, if the received destination data is already in ASCII format, the translating element 110 simply passes the ASCII destination data to the transceiver element 120. The transceiver element 120 transmits the ASCII destination data to the offboard navigation database 130 along with current location GPS data received from the satellite 140 (S230).

Figure 3:
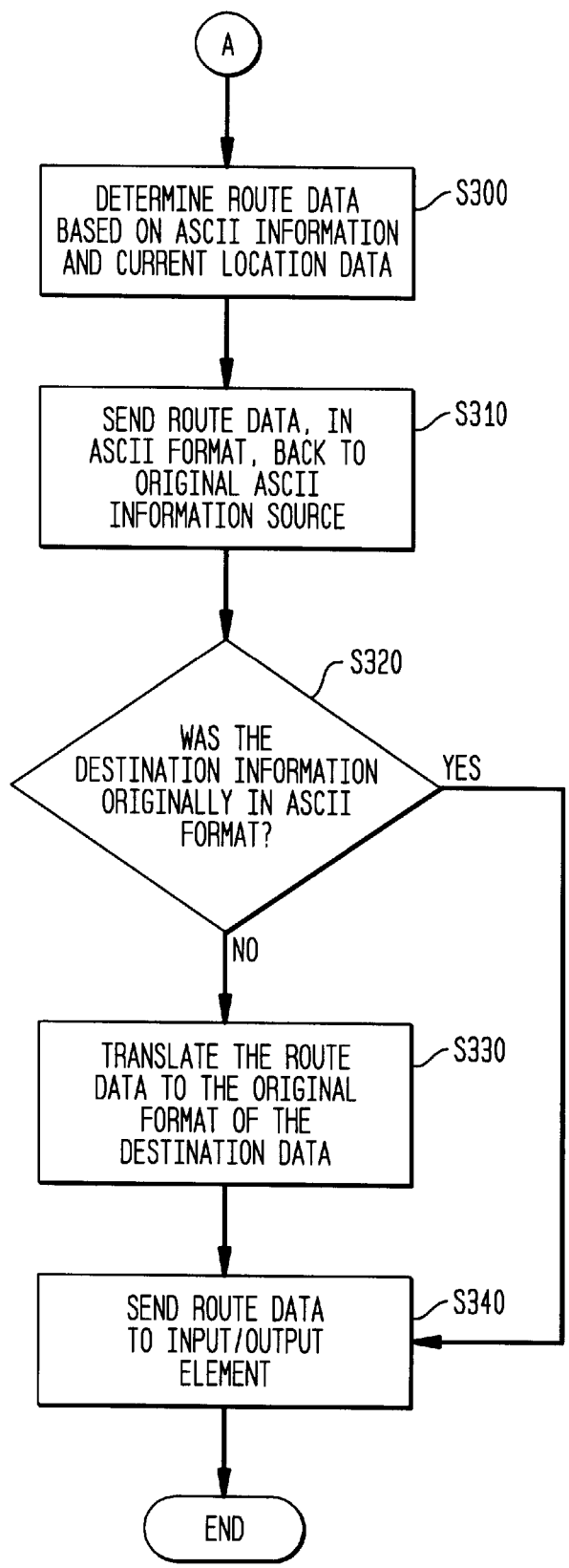
FIG. 3 illustrates a continuation of the navigation translation method illustrated in FIG. 1.

FIG. 3 illustrates a continuation of the method illustrated in FIG. 2. Based on the ASCII destination data and the current location GPS data sent by the transceiver element 120, the offboard navigation database unit 130 determines specific route data for communication back to the transceiver element 120 (S300). The offboard navigation database 130 then sends the specific route data back to the transceiver element 120, in ASCII format (S310). The transceiver element 120 then sends the received route data in ASCII format to the translating element 110, which determines if the destination data received in step S200 was originally in ASCII format (S320). If the destination data was not originally in ASCII format, the translating element 110 translates the route data to a data type that may be disseminated by the input/output element 100 (S330). The translating element 110 then sends the translated route data to the input/output element 100 for dissemination. Alternatively, at step S320, if it is determined that the destination data was originally in ASCII format, the translating element 110 simply passes the route data to the input/output element 100 for dissemination.

Figure 4:
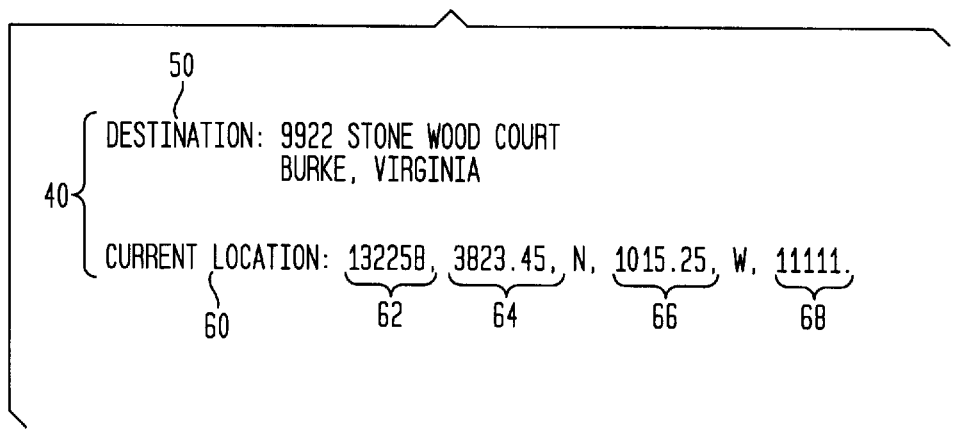
FIG. 4 illustrates destination and GPS data translated to a specific format type according to an embodiment of the present invention.
Figure 5:
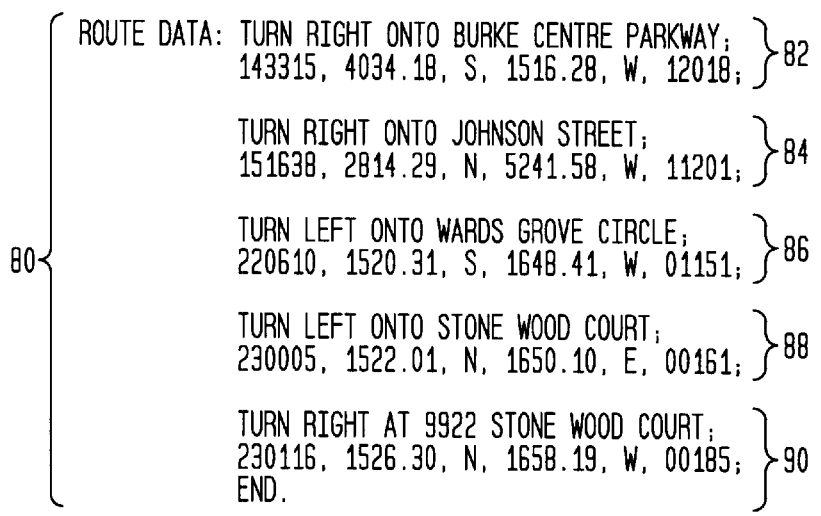
FIG. 5 illustrates received route data in the specific format type according to an embodiment of the present invention.

FIG. 4 illustrates a destination and current location package according to an embodiment of the present invention. The destination and current location data package 40 includes a destination line item 50 and a current location line item 60. New destination line item 50 has associated therewith destination data received from the input/output element 100 and translated by the translating element 110. The current location line item 60 includes GPS data received at the transceiver element 120. As seen in FIG. 4, the GPS data includes a time in hours, minutes and seconds section 62, a latitude section 64, a longitude section 66, and an altitude section 68. The destination line item 50 and the current location line item 60 are combined as the destination and current location package 40 by the transceiver element 120. This destination and current location package 40 is sent to the offboard navigation database 130 for generation of the route data package 80 (FIG. 5).

FIG. 5 illustrates a route data package according to an embodiment of the present invention. The route data package 80 includes directional commands 82, 84, 86, 88 and 90. Each of these directional commands has associated therewith specific coordinate data. The directional commands, 82, 84, 86, 88 and 90, collectively, comprise the route data package 80.

The route data package 80 is determined at the offboard navigation database 130 based on the received destination and current location package 40 from the transceiver element 120. Once the route data package 80 is determined based on this information, it is sent back to the transceiver element 120 for further communication to the translating element 110. As each of the individual coordinates in the route data package 80 is reached by the entity employing the telematics unit 10, the translating element 110 sends the associated route data command to the input/output element 100 for dissemination.

With regard to the communication medium between the transceiver element 120 and the outboard navigation database 130, this medium is preferably wireless or optical communication technology. However, other forms of communication technology may also be used to implement the novel features of the present invention. These other forms of communication technology are readily apparent to those skilled in the relevant arts.

With regard to the specific elements of the telematics unit 10, these elements may be embodied as hardware elements, or alternatively may also be embodied as software elements. For example, the input/output element 100 may be embodied as one software object, and the translating element 110 may be embodied as an independent and distinct software object. Similarly, the transceiver element 120 maybe embodied as a separate and distinct software object.

Although the translating element 110 is discussed primarily as translating data to/from ASCII format, the translating element 110 may also be designed to translate into other format types. For example, the translating element 110 may be designed to translate to/from Plain Text, Rich Text Format (RTF), etc. Moreover, the translating element may translate data to/from any of the known compressed data formats. For example, some compressed data formats include: run-length encoding (RLE), Shannon Fano coding, Huffman Coding, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for translation of navigation data, comprising the steps of:
    obtaining destination data having an original format type, and current coordinate data;
    translating the destination data having the original format type to a specific format type;
    communicating the specific format type and the current coordinate data to an offboard source, the offboard source having navigation route data associated therewith;
    receiving specific navigation route data from the offboard source in the specific format type;
    translating the received specific navigation route data in the specific format type to one of the original format type and another specific format type; and
    disseminating the translated specific navigation route data.

2. The method according to claim 1, wherein the step of translating translates the destination data to a compressed format type.

3. The method according to claim 1, wherein the current coordinate data is Global Positioning System (GPS) originated data.

4. The method according to claim 1, wherein the step of obtaining obtains the destination data where the original format type is a type other than American Standard Code for Information Interchange (ASCII).

5. The method according to claim 1, wherein the original format type is voice data.

6. The method according to claim 1, wherein the original format type is handwritten text.

7. The method according to claim 1, wherein the original format type is a selected option from a predetermined listing of selectable options.

8. The method according to claim 7, wherein the step of obtaining obtains the selected option from a peripheral device having the predetermined listing of selectable options stored thereon.

9. The method according to claim 1, wherein the step of translating translates the original format type to ASCII.

10. The method according to claim 1, wherein the step of receiving receives specific navigation route data in ASCII format.

11. The method according to claim 10, wherein the specific navigation route data includes specific routing directions pertaining to the obtained destination data, the routing directions including at least one specific navigation command for reaching a location in accordance with the obtained destination data.

12. The method according to claim 11, wherein each at least one specific navigation command has GPS data associated therewith.

13. The method according to claim 1, wherein the step of translating translates the received specific navigation route data to one of voice data and abbreviated ASCII format data.

14. The method according to claim 13, wherein the abbreviated ASCII format data includes only specific navigation commands for reaching a location in accordance with the obtained destination data.

15. The method according to claim 13, wherein the voice data includes only specific navigation commands for reaching a location in accordance with the obtained destination data.

16. A navigation data translation arrangement, comprising:

an input/output element processing destination data having an original format type;

a translating element translating the destination data having the original format type to a specific format type; and a communication element communicating the specific format type to an offboard source, the offboard source having navigation route data associated therewith, wherein the communication element receives specific navigation route data from the offboard source in the specific format type, the translating element translates the received specific navigation route data in the specific format type to one of the original format type and another specific format type, and the input/output element disseminates the translated route data.

17. The arrangement according to claim 16, wherein the input/output element is one of a keyboard, microphone, handheld device and computer.

18. The arrangement according to claim 17, wherein the handheld device and the computer both include user selectable menu entries, each entry of the user selectable menu entries serving as selectable destination data.

19. The arrangement according to claim 18, wherein the user selectable menu entries are one of addresses, landmarks, and coordinates.

20. The arrangement according to claim 16, wherein the communication element further communicates Global Positioning System (GPS) originated data to the offboard source, the GPS originated data corresponding to a current position of an entity implementing the navigation data translation arrangement.

21. The arrangement according to claim 16, wherein the specific format type is American Standard Code for Information Interchange (ASCII).

22. The arrangement according to claim 16, wherein the specific navigation route data includes specific routing directions in ASCII pertaining to the obtained destination data, the routing directions including at least one specific navigation command for reaching a location in accordance with the obtained destination data.

23. The arrangement according to claim 22, wherein each at least one specific navigation command has GPS data associated therewith.

24. A computer-readable medium having code segments embodied thereon that cause a machine to perform the method according to claim 1.

* * * * *